United States Patent
Davgalev et al.

(10) Patent No.: US 11,360,813 B1
(45) Date of Patent: *Jun. 14, 2022

(54) TIMER OBJECT MANAGEMENT FOR A MULTIPROCESSOR VIRTUAL ENVIRONMENT

(71) Applicant: Parallels International GmbH, Schaffhausen (CH)

(72) Inventors: Maxim Davgalev, Bellevue, WA (US); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 192 days.

This patent is subject to a terminal disclaimer.

(21) Appl. No.: 16/846,809

(22) Filed: Apr. 13, 2020

Related U.S. Application Data

(63) Continuation of application No. 15/421,202, filed on Jan. 31, 2017, now Pat. No. 10,664,311.

(51) Int. Cl.
  *G06F 9/455* (2018.01)
  *G06F 9/48* (2006.01)

(52) U.S. Cl.
  CPC ........ *G06F 9/4887* (2013.01); *G06F 9/45504* (2013.01)

(58) Field of Classification Search
  CPC .......................... G06F 9/4887; G06F 9/45504
  See application file for complete search history.

(56) References Cited

U.S. PATENT DOCUMENTS

| | | |
|---|---|---|
| 9,286,127 B2 | 3/2016 | Guan et al. |
| 2005/0209804 A1 | 9/2005 | Basso et al. |
| 2009/0249343 A1 | 10/2009 | Thiyagarajan et al. |
| 2009/0320030 A1 | 12/2009 | Ogasawara |
| 2014/0372786 A1 | 12/2014 | Wohlgemuth et al. |

OTHER PUBLICATIONS

USPTO, Office Action for U.S. Appl. No. 15/421,202, dated Nov. 14, 2018.
USPTO, Final Office Action for U.S. Appl. No. 15/421,202, dated May 8, 2019.
USPTO, Office Action for U.S. Appl. No. 15/421,202, dated Sep. 19, 2019.
USPTO, Advisory Action for U.S. Appl. No. 15/421,202, dated Aug. 6, 2019.
USPTO, Notice of Allowance for U.S. Appl. No. 15/421,202, dated Jan. 13, 2020.

*Primary Examiner* — Diem K Cao
(74) *Attorney, Agent, or Firm* — Rosenberg, Klein & Lee

(57) ABSTRACT

A new timer object that is associated with a timer event may be identified. A virtual processor that is to be provided the timer event that is associated with the new timer object may be determined. One or more current timer objects that are associated with one or more timer events provided to the virtual processor may also be identified. A new element for the new timer object may be created in a list identifying the one or more current timer objects that are associated with the one or more timer events that are provided to the virtual processor.

20 Claims, 7 Drawing Sheets

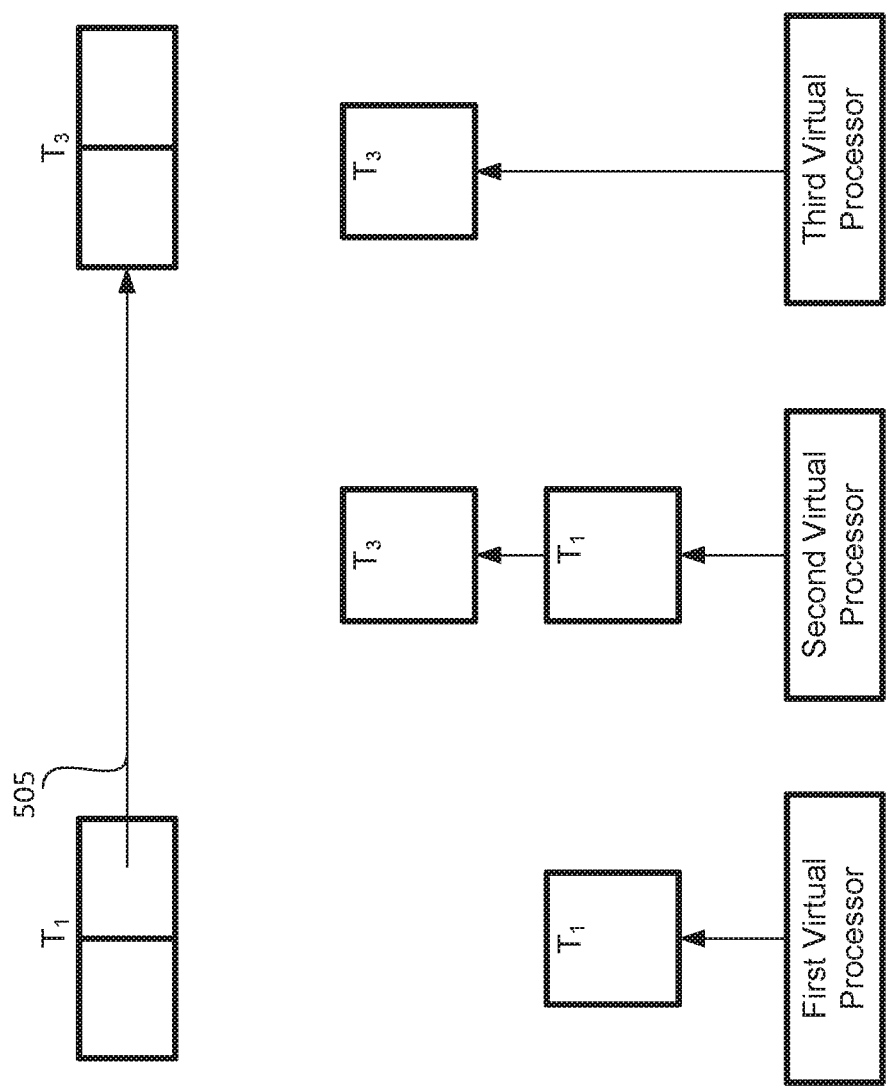

11,360,813 B1

TIMER OBJECT MANAGEMENT FOR A MULTIPROCESSOR VIRTUAL ENVIRONMENT

RELATED APPLICATIONS

This application is a continuation of U.S. patent application Ser. No. 15/421,202 filed on Jan. 31, 2017 which has issued as U.S. Pat. No. 10,664,311, the entire content of which is incorporated by reference herein.

TECHNICAL FIELD

Embodiments of this disclosure relate generally to computer systems and, more specifically, relate to timer object management for a multiprocessor virtual environment.

BACKGROUND

A timer event may be an event that is triggered by a defined timer. A processor may support multiple virtual processors which may be provided with an indication of an occurrence of the event. A timer object may be associated with the timer event that is to be provided to corresponding virtual processors when the time of the timer object expires.

BRIEF DESCRIPTION OF THE DRAWINGS

The present disclosure will be understood more fully from the detailed description given below and from the accompanying drawings of various implementations of the disclosure.

FIG. 5B illustrates the global linked list and local timer object lists after the timer object has been deleted in accordance with some embodiments.

DETAILED DESCRIPTION

Figure 1:
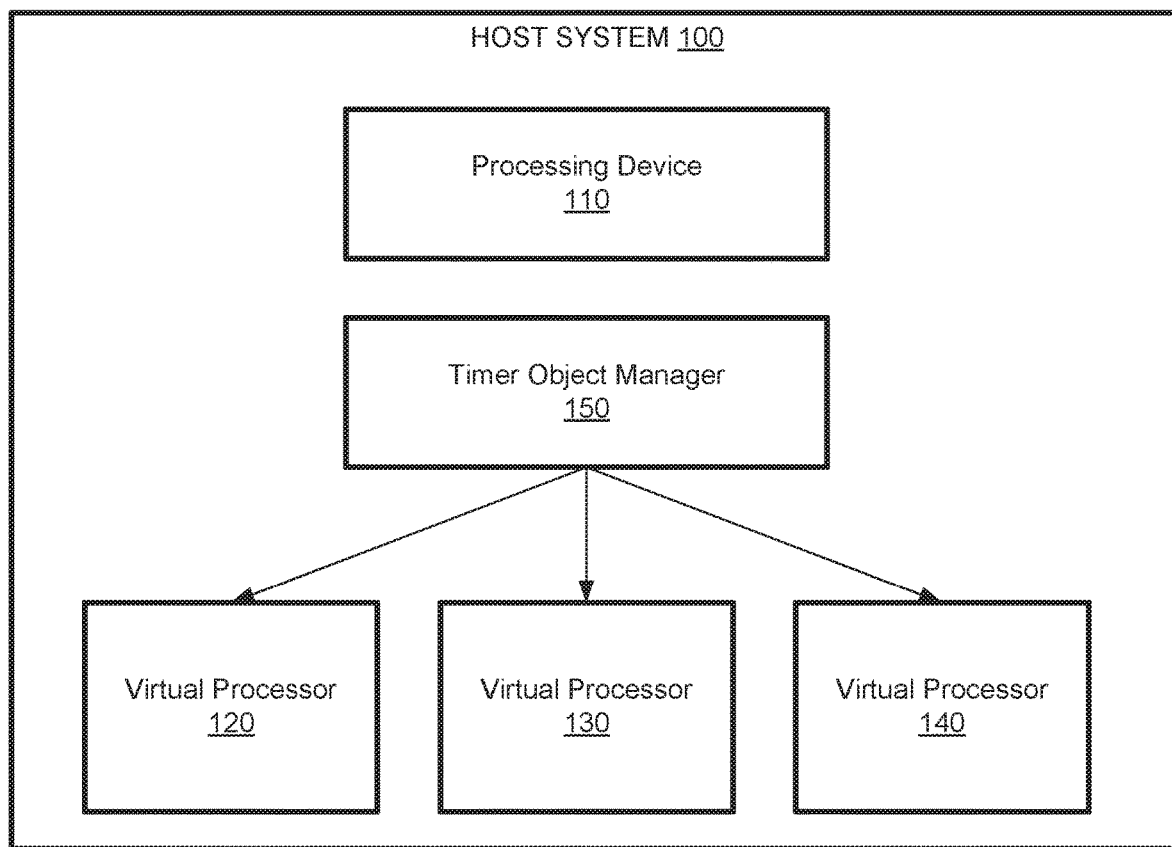
FIG. 1 illustrates an example host system for the management of timer objects for virtual processors in accordance with some embodiments.

Aspects of the present disclosure are directed to the management of timer objects for virtual processors. A timer object may be associated with a timer event that is to be provided based on the timer object to corresponding virtual processors when the time of the timer object expires.

A system may support or provide multiple virtual processors that may each use different combinations of timer objects. For example, a first virtual processor may receive timer events associated with a first timer object and a second timer object while a second virtual processor may receive timer events associated with the first timer object and a third timer object. The various timer objects may be identified in a data structure, such as a global linked list, that may identify the different timer objects used by the different virtual processors supported by a host system. For example, the global linked list may sort or organize the timer objects based on when the timer objects activate (e.g., when the corresponding time expires and a timer event occurs). Thus, the timer objects in the global linked list may be organized in an ascending order based on the expiration time of the timer objects so that the first timer object to be activated is first in the global linked list and the last timer object to be activated is last in the global linked list.

The global linked list may be used to identify the next timer associated with a virtual processor. For example, in order to determine the next timer associated with the virtual processor, each timer object of the global linked list may be scanned to determine whether each timer object provides a timer event to the virtual processor. Such a scanning operation may use additional computation time and resources due to additional algorithmic complexity for searching through each of the timer objects of the global linked list. Furthermore, adding or removing a timer object may also use additional computation time.

Aspects of the present disclosure address the above and other deficiencies by reducing the computation time that is used to determine the next timer associated with a particular virtual processor. For example, a global linked list specifying each timer object used by any virtual machine supported or provided by the host system may be generated based on ascending order of the respective expiration time for each timer object (e.g., based on when a timer event occurs). An additional local timer object list may be maintained for each virtual processor that is supported or provided by the host system. Each local timer object list may also be sorted or organized based on ascending order of the respective expiration time for each timer object. For example, the local timer object list may be sorted or organized based on when a timer event occurs for an associated virtual processor. Thus, the organization of the timer objects in the global linked list may facilitate a faster determination of the nearest timer event for the entire system that is to be handled while the organization of the elements associated with the timer objects in the local timer object lists enables a faster determination of the next timer event for a particular virtual processor. For example, the determination of the next timer event for the entire system as well as for a single virtual processor may be executed in a single step (e.g., the computational complexity is O(1)). Such an organization of the timer objects may further facilitate the scheduling of virtual processors (e.g., to limit the sleep state of a virtual processor until the next timer event for the virtual processor or executing of guest code until the next timer event). The organization of the timer objects may be used to emulate guest time and guest timer objects and improve the performance and precision of a host system with respect to the timer events. For example, the performance of multimedia applications (e.g., video and audio) and the calibration of guest timer objects may be improved. Furthermore, the organization of the timer objects as described herein may facilitate the removing of timer objects from the host system supporting multiple virtual processors in the case of local timer objects lists usage.

The global linked list of timer objects may include multiple elements, or nodes, where each of the elements of the global linked list corresponds to or represents a timer object. Thus, the global linked list may be considered to include one or more timer objects. The timer objects may include pointers to other timer objects and a pointer to an element in a local timer object list that identifies each timer object that is associated with a timer event for a particular virtual processor. Each element in the local timer object list may include a pointer to an element in another local timer object list that identifies another virtual processor that is also associated with the same timer object. Thus, the pointer from the timer object in the global linked list may identify an element in a first local timer object list for a virtual processor and the element may identify another element in a second local timer object list of another virtual processor that is also associated with the same timer object. Thus, in order to identify a next timer event that is expected by a particular virtual processor, the local timer object list for the virtual processor may be retrieved and the first element in the local timer object list may identify the next timer event that is to be received for the virtual processor.

In addition, removing timer objects and corresponding elements from the global linked list and the local timer object lists may be optimized to increase efficiency (e.g., less computation time) of removing the timber objects. For example, each additional element in each local timer object list may be removed based on the pointer from the timer object in the global linked list which may identify an element associated with the timer object in a first local timer object list and pointers between elements associated with the same timer object in another local tinter object lists.

FIG. 1 illustrates an example host system 100 for the management of timer objects for virtual processors. In general, the host system 100 may include one or more physical processing devices 110 or central processing units (CPUs) that may be used to support or provide resources for one or more virtual processors or virtual CPUs.

As shown in FIG. 1, the host system 100 may be, but is not limited to, a desktop computer, laptop computer, rack-mount server, router, switch, tablet computer, mobile phone, or any other type of computing device. The host system 100 may include hardware resources such as one or more processing devices 110, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines, or other applications.

A hypervisor executed by the host system 100 may manage virtual processors 120, 130, and 140 that may be assigned to one or more virtual machines running on the hypervisor. In particular, the hardware resources or utilization of the one or more processing devices 110 may be distributed or assigned to the virtual processors 120, 130, and 140. For example, the virtual processors 120, 130, and 140 may be a software-based emulation of the one or more processing devices 110 (e.g., physical hardware processing devices) that operate based on the architecture and functions of the one or more processing devices 110. Thus, each of the virtual processors 120, 130, and 140 may emulate at least one of the physical processing devices 110 of the host system 100 for a respective virtual machine.

As shown in FIG. 1, the host system 100 may include a timer object manager 150 that may manage the use of timer objects that are used to provide timer events to the virtual processors 120, 130, and 140. Timer events may be used for emulation of guest virtual timer interrupts as well as for other purposes, for example, to change data or bits in an internal register or memory element after a period of time corresponding to the timer object expires or to increment an internal counter that counts at a particular frequency. The time object manager 150 may be an independent application or be part of the hypervisor or another component of the host system 100.

The processor may receive an interrupt that may indicate the occurrence of a particular event where the processor may suspend its current instruction execution and address the event indicated by the interrupt. Similarly, the virtual processors 120, 130, and 140 supported by the processor may also receive interrupts that indicate the occurrence of the event that the corresponding virtual processors may perform an action based on the received interrupt. Thus, an interrupt may be used to alert any combination of the virtual processors 120, 130, and 140 with regard to a high-priority condition that may result in the interruption of the code or software that the virtual processor 120, 130, or 140 is currently executing. In response to receiving the interrupt, the virtual processor 120, 130, or 140 may suspend its current execution, save its execution state, and execute a new function referred to as an interrupt handler to address the event identified by the interrupt. In response to the interrupt handler completing a routine to address the event, the virtual processor 120, 130, or 140 may resume the execution of the code or software based on the saved execution state.

In some embodiments, an interrupt may be provided to one or more of the virtual processors 120, 130, and 140 based on an expiration of a timer object. For example, when a particular timer object expires, an interrupt may be provided to one or more of the virtual processors 120, 130, and 140 so that a virtual machine monitor may address a timer event for each virtual processor that is provided the interrupt.

Figure 2:
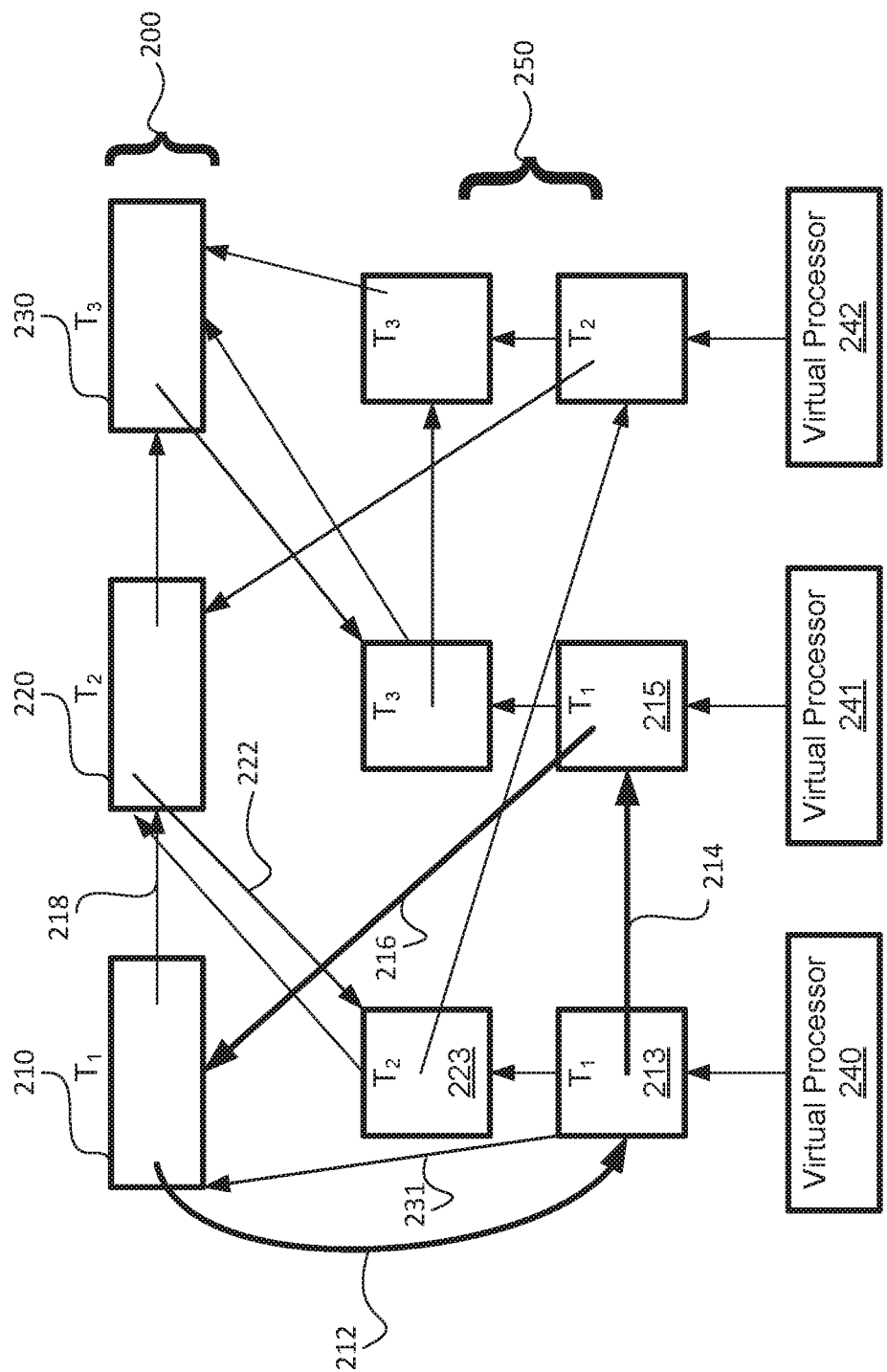
FIG. 2 illustrates an example representation of a global linked list of timer objects associated with local timer object lists of virtual processors in accordance with some embodiments.

FIG. 2 illustrates an example representation of a global linked list 200 of timer objects associated with local timer object lists 250 of virtual processors. The global linked list 200 and the local timer objects lists 250 may be generated and maintained by a timer object manager 150 of FIG. 1.

As shown in FIG. 2, the global linked list 200 may include multiple elements where each element corresponds to or represents one timer object. The global linked list 200 may specify one or more timer objects that are used in a system (e.g., a host system supporting virtual processors associated with virtual machines). The timer object 210 may correspond to a first timer object, the timer object 220 may correspond to a second timer object, and the timer object 230 may correspond to a third timer object. The timer objects of the global linked list 200 may be ordered or organized based on an ascending order of when a time of the timer objects expires (e.g., reaches zero). In some embodiments, an event associated with the timer object may be triggered or activated based on a comparison of the current guest virtual time with an expiration time of a timer object that may be based on a sum of a time interval (an amount of time after which a timer event occurs) and a guest virtual time that was taken at the moment of the activation of the timer object. Thus, the first timer object 210 may be considered to expire and activate a timer event before the second timer object 220 expires and activates another timer event.

Each timer object in the global linked list 200 may include one or more fields. Examples of such fields include, but are not limited to, pointers, an expiration time or counter for a timer object, flags, etc. As shown, the first timer object 210 may include a pointer 212 that links to or points to an element 213 in a local timer object list that corresponds to a first virtual processor 240. The element 213 may be part of a local timer object list of multiple local timer object lists 250. The element 213 may be used to represent that the first timer object 210 provides a timer event to the first virtual processor 240. The element 213 may also include a pointer 214 to an element 215 in a second local timer object list that corresponds to a second virtual processor 241. The element 215 may be used to represent that the first timer object 210 also provides the timer event to the second virtual processor 241. Furthermore, the elements 213 and 215 include pointers back to the first timer object 210 in the global linked list 200 (e.g., pointers 231 and 216 respectively). Such pointers identify associated timer object and may be used to provide faster access to the data of the related timer object from the corresponding elements of local timer object lists. In some embodiments, the element 215 may identify that a pointer to an element in another local timer object list is null to identify that the element 215 is the final or last element of a list of related elements which are associated with the timer object 210. Thus, the null pointer may indicate that the virtual processor 241 is the last virtual processor that receives a timer event based on the first timer object. Similarly, the last element 223 in the local timer object list for the virtual processor 240 may identify that a pointer to the next element of the local timer object list is null to indicate that the element 223 is the last element for the particular virtual processor that is associated with one of the timer objects in the global linked list. The first timer object 210 may further include a pointer 218 to the second timer object 220 of the global linked list 200. Similarly, the second timer object 220 of the global linked list 200 may include a pointer 222 to the element 223 in a local timer object list that is used to represent that the second timer object also provides a timer event to the first virtual processor 240.

Thus, the global linked list 200 and the local timer object lists 250 may represent timer objects and may identify which timer objects are used to provide timer events to particular virtual processors. For example, as shown, the first virtual processor 240 may be provided timer events based on the first timer object 210 and the second timer object 220. The second virtual processor 241 may be provided timer events based on the first timer object and the third timer object 230 and the third virtual processor 242 may be provided timer events based on the second timer object and the third timer object. In some embodiments, the local timer object lists representing the various timer objects that are used to provide timer events to the respective virtual processors may also be organized or ordered based on expiration time (the expiration of the time for the timer objects). For example, for the local timer object list for the first virtual processor 240, the first timer object may be represented before the second timer object (e.g., the element 213 is ordered before the element 223 so that a pointer from the virtual processor 240 points to or links to the element 213).

Thus, the timer objects represented by the global linked list 200 may be organized based on the expiration of the time for the timer objects. Each virtual processor may also include a local timer object list. Each element of the local timer object lists 250 may point to or identify its corresponding element in the global linked list 200 and the elements of the local timer object lists 250 may also be organized based on the expiration of the time for the corresponding timer objects. Each element of the local timer object lists 250 that represents the same timer object of the global linked list 200 may also be linked by a pointer. Furthermore, the timer objects of the global linked list 200 may include a head pointer (e.g., a pointer to the first element of a list of related elements which are associated with the same timer object in the global linked list and are linked in different local timer object lists) to the various elements of the local timer object lists 250 that represent the virtual processors that are provided a timer event based on the timer object with the head pointer. Thus, each of the elements in the local timer object lists 250 may include a first pointer to the next element in the same local timer object list (e.g., element 213 pointing to element 223 in the same local timer object list), a second pointer to an element in another local timer object list (e.g., element 213 pointing to element 215), and a third pointer to the respective timer object of the global linked list (e.g., element 213 pointing to element 210).

Although FIG. 2 illustrates each virtual processor being provided a timer event based on a timer object, a particular virtual processor may not receive a timer event associated with one of the timer objects. Thus, the local timer objects list 250 may identify the particular virtual processor, but no pointer from an element of another local timer object list may point to an element of the local timer object list corresponding to the particular virtual processor. In some embodiments, if a virtual processor does not receive any timer events, then the local timer object list for the virtual processor may be empty.

Figure 3:
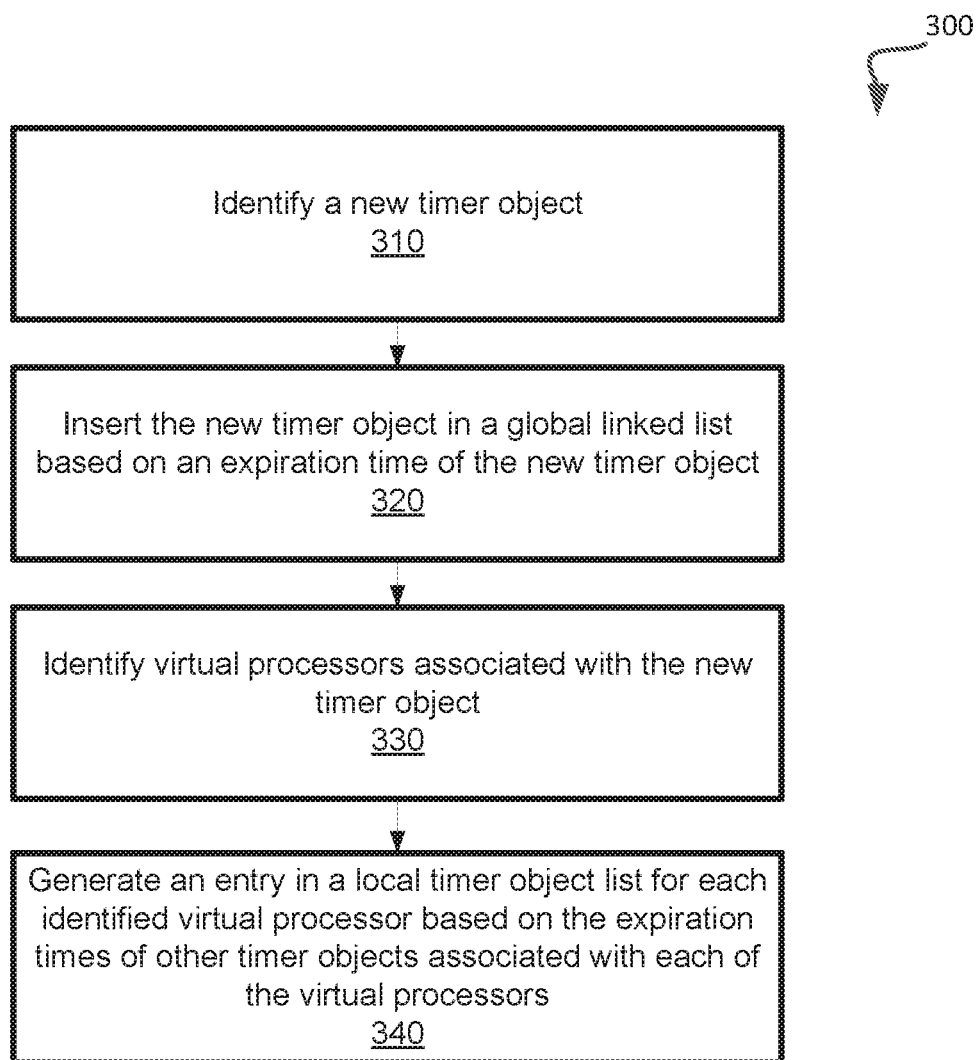
FIG. 3 is a flow diagram of an example method to insert a new timer object into a global linked list in accordance with some embodiments of the present disclosure.

FIG. 3 is a flow diagram of an example method 300 to insert a new timer object into a global linked list. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the timer object manager 150 of FIG. 1.

As shown in FIG. 3, the method 300 may begin with the processing logic identifying a new timer object (block 310). For example, a request to create a new timer object that is used to provide a timer event to one or more virtual processors may be received. The new timer object may specify an amount of time after which the new timer object expires and the associated timer event is provided. The processing logic may subsequently insert the new timer object in a global linked list based on an expiration time of the new timer object (block 320). For example, the expiration times of existing timer objects may be identified and the new timer object may be inserted based on the expiration times of existing timer objects that are currently being used to provide timer events to virtual processors. For example, the new timer object may be inserted so that the expiration times of the timer objects in the global linked list are in ascending order. As described in further detail with respect to FIGS. 5A-5B, the inserting of the new timer object into the global linked list may result in a changing of pointers between timer objects of the global linked list and elements of the local timer object lists.

Referring to FIG. 3, the processing logic may identify virtual processors associated with the new timer object (block 330). For example, the virtual processors that receive or are provided a timer event based on the new timer object may be identified. In some embodiments, the virtual processors may be identified based on an affinity mask that is provided with the new timer object. The affinity mask may include multiple bits where each bit may correspond to a single virtual processor. A first value for a particular bit may identify that the new timer object provides a timer event to a particular virtual processor and a second value for the particular bit may identify that the new timer object does not provide the timer event to the particular virtual processor. Thus, the affinity mask may include at least one bit that represents each virtual processor that is supported by a host system and a value of the bits may be used to identify whether each virtual processor is to receive a timer event based on the timer object that is associated with the affinity mask.

Furthermore, the processing logic may generate an element (or entry) in the local timer object lists for each identified virtual processor based on the expiration times of other timer objects associated with each of the virtual processors (block 340). For example, elements for the new timer object may be inserted into the local timer object lists for each of the virtual processors that receives a timer event based on the new timer object so that the elements are in ascending order with respect to an expiration time of the timer objects that provide timer events for the virtual processors.

Thus, a new timer object may be used to provide a timer event to one or more virtual processors by inserting the new timer object into the global linked list and inserting a new element to each local timer object list for each virtual processor that receives the timer event based on the new timer object. The various elements may be inserted based on the expiration time of the existing timer objects and the new timer object. A pointer from the new timer object in the global linked list may be created to point or link to a new element in a local timer object list. Furthermore, a pointer from the new element in the local timer object list may point to or link to an element in another local timer object list for another virtual processor that receives the timer event based on the new timer object.

Figure 4:
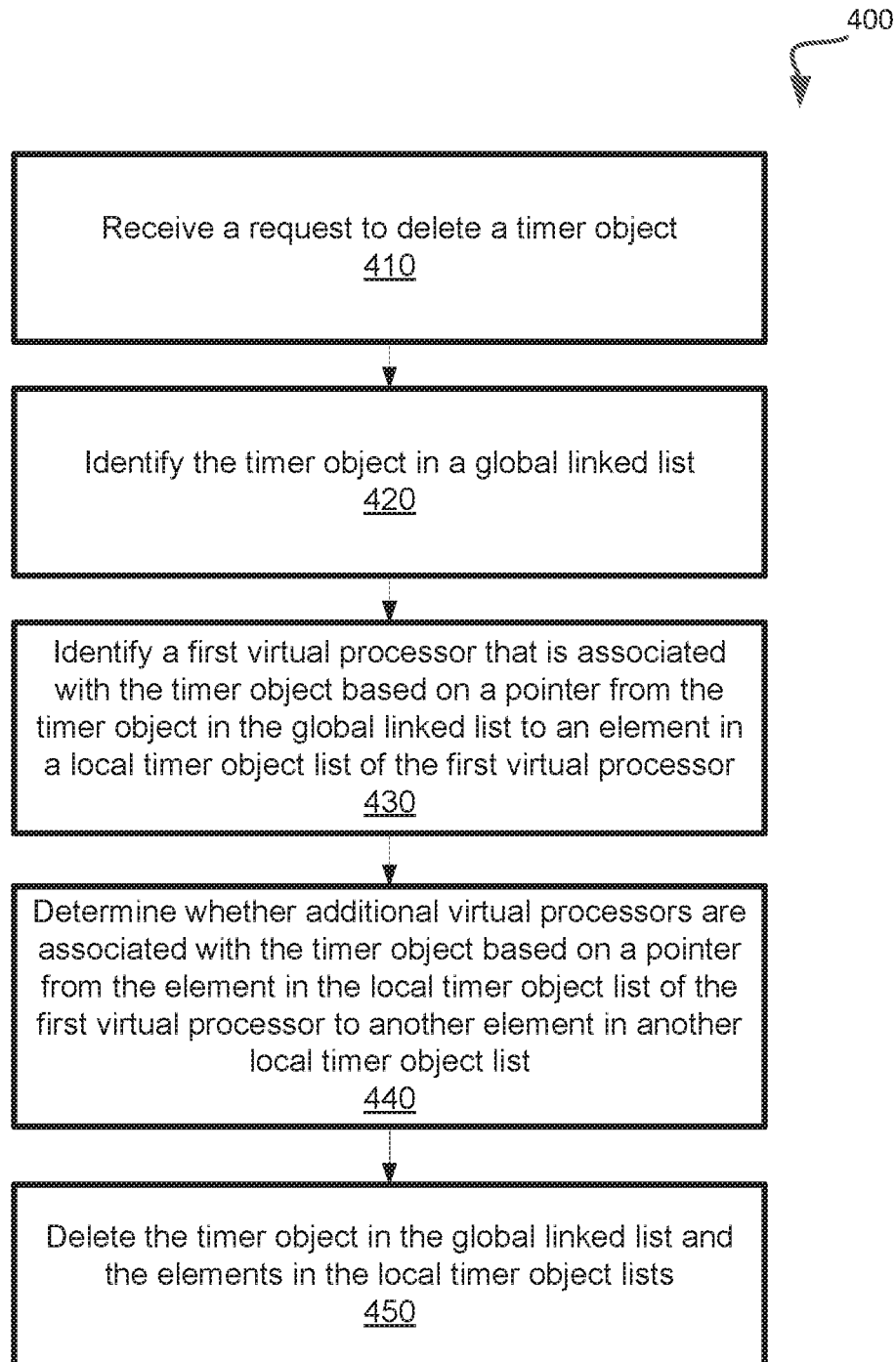
FIG. 4 is a flow diagram of an example method to delete an existing timer object from the global linked list in accordance with some embodiments.

FIG. 4 is a flow diagram of an example method 400 to delete an existing timer object from the global linked list. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the timer object manager 150 of FIG. 1.

As shown in FIG. 4, the method 400 may begin with the processing logic receiving a request to delete a timer object (block 410). The request may correspond to delete a timer object that is currently used to provide a timer event to at least one virtual processor that is provided or supported by a host system. The timer object may be specified in the global linked list. The processing logic may further identify the timer object in a global linked list (block 420). For example, the timer object may be identified from multiple timer objects of the global linked list. The processing logic may further identify a first virtual processor that is associated with the timer object based on a pointer from the timer object of the global linked list to an element in a local timer object list of the first virtual processor (block 430). The processing logic may further determine whether other virtual processors are associated with the timer object that is to be deleted based on a pointer from the element in a local timer object list of the first virtual processor (block 440). For example, the element in the local timer object list for the first virtual processor may include a pointer to an element in another local timer object list for a second virtual processor which is also associated with the same timer object. Furthermore, the element in the other local timer object list may also include a pointer to an element in another local timer object list for a third virtual processor. Each of the virtual processors may be identified by following the pointers of the elements in the local timer object lists until a pointer of an element of one of the local timer object lists is equal to null (e.g., does not point to an element in another local timer object list). The processing logic may further delete the timer object in the global linked list and the elements in the local timer object lists (block 450). For example, the entry for the timer object may be removed or deleted from the global linked list that may include entries for one or more or each of the timer objects and from each local timer object list for virtual processors that receive timer events based on the timer object that is to be deleted. The pointers between elements may also be changed as described in conjunction with FIGS. 5A and 5B.

Figure 5A:
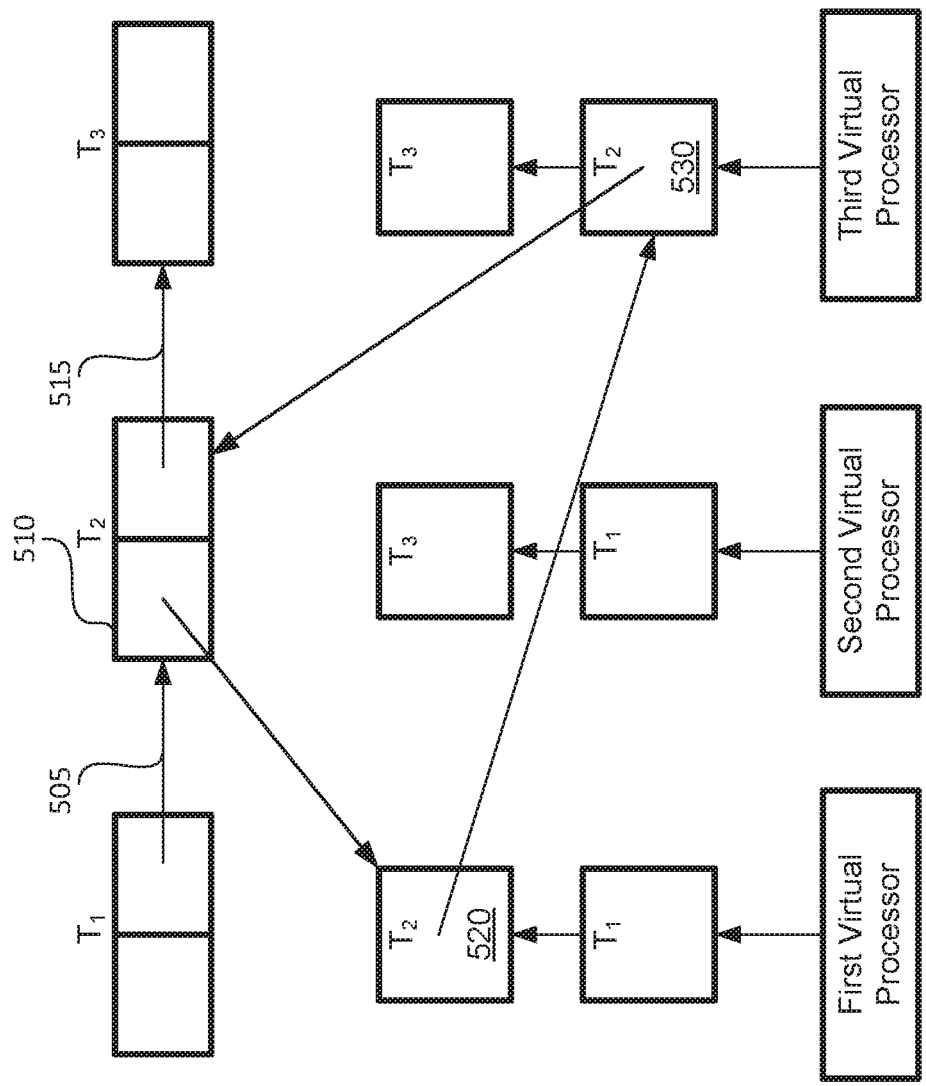
FIG. 5A illustrates an example of a timer object that is to be deleted based on a global linked list and local timer object lists in accordance with some embodiments of the present disclosure.

FIG. 5A illustrates an example of a timer object that is to be deleted based on a global linked list and local timer object lists. As shown, the timer object 510 may currently be used to provide a timer event to virtual processors supported by a host system. For example, the timer object 510 may be used to provide a timer event to the first virtual processor and the third virtual processor since a pointer of the timer object 510 in the global linked list points to an element 520 in the local timer object list of the first virtual processor and a pointer from the element 520 points to an element 530 in the local timer object list of the third virtual processor. Furthermore, a pointer 505 points from a prior timer object (e.g., a timer object expiring before the timer object 510) and a pointer 515 from the timer object 510 points to a later timer object (e.g., a timer object expiring after the timer object 510).

FIG. 5B illustrates the global linked list and local timer object lists after the timer object of FIG. 5A has been deleted. For example, as shown, the element 520 in the local timer object list of the first virtual processor and the element 530 in the local timer object list of the third virtual processor may be deleted or removed. Furthermore, the timer object 510 in the global linked list may also be removed and the pointer 505 may be changed or modified to point to the later timer object. Thus, a deleting or removing of a timer object may result in the removing of one or more elements in a local timer object lists and an entry of the timer object in the global linked list and a changing of a pointer that previously linked to the timer object in the global linked list that is deleted. Pointers between the remaining elements may remain as shown in FIG. 2.

Figure 6:
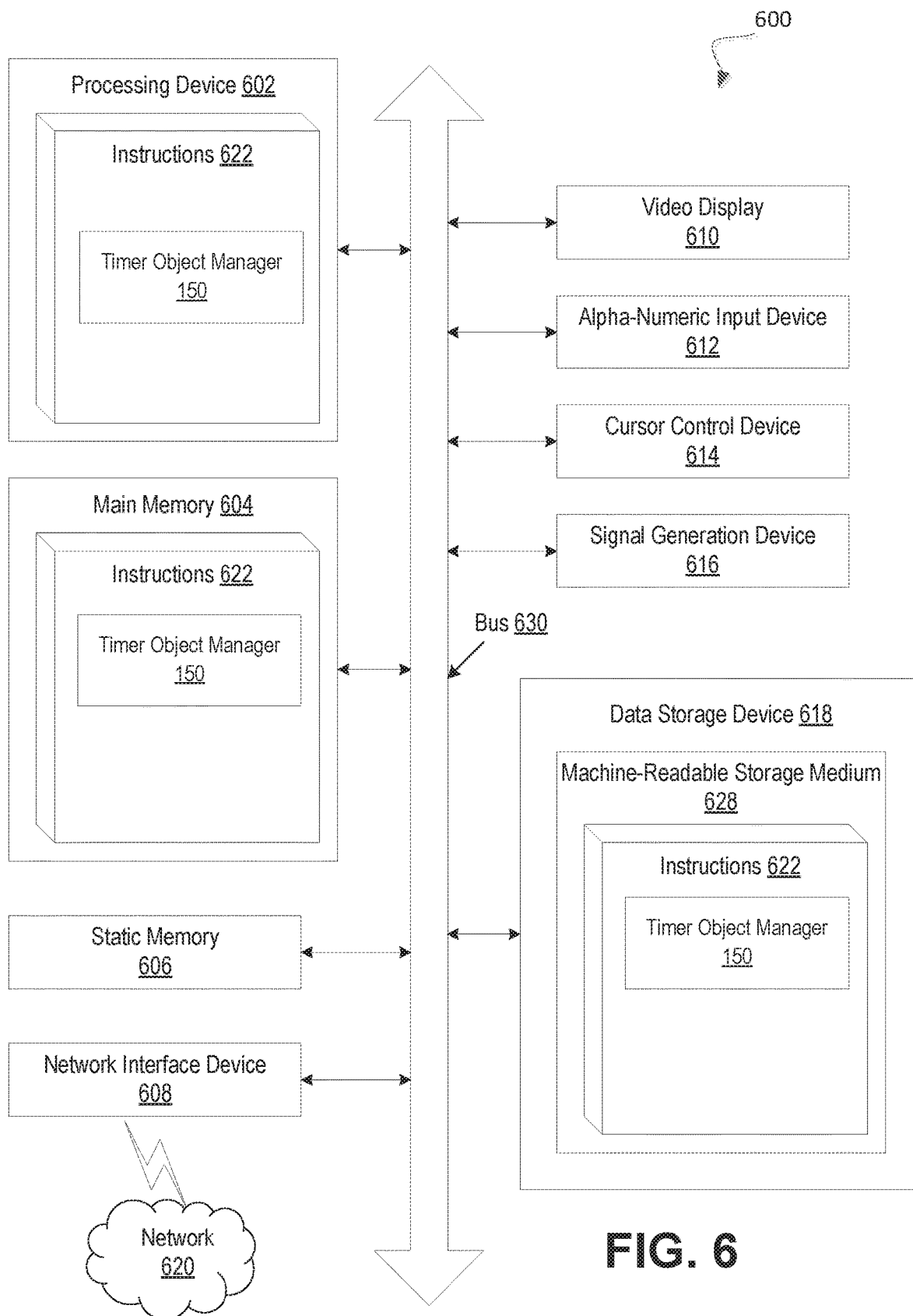
FIG. 6 illustrates a block diagram of an example computer system in which some embodiments of the disclosure may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions to implement functionality corresponding to a timer object manager (e.g., timer object manager 150 of FIG. 1). While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
identifying, by a host computer system running a virtual machine, a particular timer object associated with an expiration time;
identifying a first virtual processor implemented by the host computer system to be associated with the particular timer object;
identifying a global list referencing a plurality of timer objects associated with the virtual machine;
inserting, based on the expiration time, a global element associated with the particular timer object into the global list;
identifying a first processor-specific list referencing a plurality of timer objects associated with the first virtual processor;
inserting, based on the expiration time, a first element associated with the particular timer object into the first processor-specific list, wherein the first element references the global element;
identifying, using the first processor-specific list, a nearest timer event corresponding to a nearest timer object associated with the first virtual processor; and
limiting duration of a sleep state of the first virtual processor by an expiration time of the nearest timer event.

2. The method of claim 1, further comprising:
receiving a request to remove a specified timer object;
removing, from the global list, a first element associated with the specified timer object; and
removing, from the first processor-specific list, a second element associated with the specified timer object.

3. The method of claim 2, further comprising:
modifying a pointer of a previous element of the global list to point to a next element of the global list, wherein the previous element precedes the first element associated with the specified timer object, and wherein the next element follows the first element associated with the specified timer object.

4. The method of claim 1, further comprising:
identifying the first virtual processor based on an affinity mask associated with the particular timer object.

5. The method of claim 1, wherein the first element references a second element of a second processor-specific list associated with a second virtual processor implemented by the host computer system.

6. The method of claim 5, further comprising:
removing, from the second processor-specific list, a third element associated with the specified timer object.

7. The method of claim 1, wherein the global list is sorted by expiration times of the timer objects associated with the host computer system.

8. A host computer system comprising:
a memory; and
a processing device, operatively coupled with the memory, wherein the processing device is configured to:
identify a particular timer object associated with an expiration time;
identify a first virtual processor implemented by the host computer system to be associated with the particular timer object;
identify a global list referencing a plurality of timer objects associated with a virtual machine that comprises the first virtual processor;
insert, based on the expiration time, a global element associated with the particular timer object into the global list;
identify a first processor-specific list referencing a plurality of timer objects associated with the first virtual processor;
insert, based on the expiration time, a first element associated with the particular timer object into the first processor-specific list, wherein the first element references the global element;
identify, using the first processor-specific list, a nearest timer event corresponding to a nearest timer object associated with the first virtual processor; and
limit duration of a sleep state of the first virtual processor by an expiration time of the nearest timer event.

9. The host computer system of claim 8, wherein the processing device is further to:
receive a request to remove a particular specified timer object;
remove, from the global list, a first element associated with the specified timer object; and
remove, from the first processor-specific list, a second element associated with the specified timer object.

10. The host computer system of claim 9, wherein the processing device is further to:
modify a pointer of a previous element of the global list to point to a next element of the global list, wherein the previous element precedes the first element associated with the specified timer object, and wherein the next element follows the first element associated with the specified timer object.

11. The host computer system of claim 8, wherein the processing device is further to:
identify the first virtual processor based on an affinity mask associated with the particular timer object.

12. The host computer system of claim 8, wherein the first element references a second element of a second processor-specific list associated with a second virtual processor implemented by the host computer system.

13. The host computer system of claim 12, wherein the processing device is further to:
remove, from the second processor-specific list, a third element associated with the specified timer object.

14. The host computer system of claim 8, wherein the global list is sorted by expiration times of the timer objects associated with the host computer system.

15. A non-transitory computer readable medium comprising executable instructions that, when executed by a processing device of a host computer system, cause the processing device to:
identify a particular timer object associated with an expiration time;
identify a first virtual processor implemented by the host computer system to be associated with the particular timer object;
identify a global list referencing a plurality of timer objects associated with a virtual machine that comprises the first virtual processor;
insert, based on the expiration time, a global element associated with the particular timer object into the global list;
identify a first processor-specific list referencing a plurality of timer objects associated with the first virtual processor;

insert, based on the expiration time, a first element associated with the particular timer object into the first processor-specific list, wherein the first element references the global element;

identify, using the first processor-specific list, a nearest timer event corresponding to a nearest timer object associated with the first virtual processor; and limit duration of a sleep state of the first virtual processor by an expiration time of the nearest timer event.

16. The non-transitory computer readable medium of claim 15, further comprising executable instructions that, when executed by the processing device, cause the processing device to:

identify the first virtual processor based on an affinity mask associated with the particular timer object.

17. The non-transitory computer readable medium of claim 15, further comprising executable instructions that, when executed by the processing device, cause the processing device to:

receive a request to remove a particular specified timer object;

remove, from the global list, an element associated with the specified timer object;

remove, from the first processor-specific list, a first element associated with the specified timer object;

modify a pointer of a previous element of the global list to point to a next element of the global list, wherein the previous element precedes the element associated with the specified timer object, and wherein the next element follows the element associated with the specified timer object.

18. The non-transitory computer readable medium of claim 15, wherein the first element references a second element of a second processor-specific list associated with a second virtual processor implemented by the host computer system.

19. The non-transitory computer readable medium of claim 18, further comprising executable instructions that, when executed by the processing device, cause the processing device to:

remove, from the second processor-specific list, a third element associated with the specified timer object.

20. The non-transitory computer readable medium of claim 15, wherein the global list is sorted by expiration times of the timer objects associated with the host computer system.

* * * * *